US005579242A

United States Patent [19]

Fisher

[11] Patent Number: 5,579,242

[45] Date of Patent: Nov. 26, 1996

[54] SYSTEM FOR ELECTRONIC RECORDING AND ACCOUNTING OF MOTOR VEHICLE MILEAGE

[76] Inventor: Janice V. Fisher, 322 Weatherbee Rd., Fort Pierce, Fla. 34950

[21] Appl. No.: 294,909

[22] Filed: Aug. 24, 1994

[51] Int. Cl.[6] .......... G06F 17/00

[52] U.S. Cl. .......... 364/550; 364/561; 364/467

[58] Field of Search .......... 364/550, 424.03, 364/424.04, 561, 442, 467, 424.05, 431.12, 401–407; 340/439, 441, 436; 235/380

[56] References Cited

U.S. PATENT DOCUMENTS

| | | | |
|---|---|---|---|
| 3,624,608 | 11/1971 | Altman | 340/152 |
| 3,665,397 | 5/1972 | Di Napoli et al. | 340/149 |
| 3,964,016 | 6/1976 | Yamada et al. | 340/436 |
| 3,983,372 | 9/1976 | Klaver | 364/442 |
| 4,031,363 | 6/1977 | Freeman et al. | 364/424.04 |
| 4,179,740 | 12/1979 | Malin | 364/442 |
| 4,188,529 | 2/1980 | Schochat et al. | 364/561 |
| 4,559,637 | 12/1985 | Weber | 364/561 |
| 5,046,029 | 9/1991 | Ikeda | 364/561 |
| 5,191,523 | 3/1993 | Whitesage | 364/407 |
| 5,267,159 | 11/1993 | O'Neall | 364/424.04 |
| 5,303,163 | 4/1994 | Ebaugh et al. | 364/550 |
| 5,459,304 | 10/1995 | Eisenmann | 235/380 |

*Primary Examiner*—James P. Trammell
*Attorney, Agent, or Firm*—Malin, Haley, DiMaggio & Crosby, P.A.

[57] ABSTRACT

A system which enables the user to accurately determine the business and personal usage of a motor vehicle by converting mileage information received from the odometer of the vehicle into an electronic format that is transferable to magnetic disk and compatible with personal computer accounting and database software. The system contains a device for receiving input from the user comprised of an alphanumeric keypad and magnetic disk drive. The system displays information to the user through a liquid crystal or light emitting diode display. A microprocessor correlates information received from the user with information received from the motor vehicle to compute mileage and assign usage of the motor vehicle to an account provided by the user. The microprocessor records the mileage and account information onto a magnetic disk which can be used with personal computer software to determine the total distance traveled, and the costs and expenses associated with the usage of the vehicle.

12 Claims, 1 Drawing Sheet

SYSTEM FOR ELECTRONIC RECORDING AND ACCOUNTING OF MOTOR VEHICLE MILEAGE

BACKGROUND OF THE INVENTION

1. Field of the Invention

This invention relates to the recordation of motor vehicle mileage in an electronic format that is readily transferable to computer databases enabling the user to accurately account for business and personal use of the motor vehicle.

2. Discussion of the Prior Art

Many businesses (e.g., movers, caterers, police departments) and business people (e.g., salesmen, lawyers, doctors) use motor vehicles as a means to transact a large portion of their business. For these enterprises to remain cost competitive, it is important that an accurate accounting be made of business and personal mileage for these motor vehicles. Although meters in motor vehicles and other inventions are available that record distance traveled, such as U.S. Pat. No. 5,046,029 to Hiroshi Ikeda, none are adapted for the specific purpose of recording that information to an electronic format that is readily transferable to a computer database upon which calculations can be performed for overall efficiency in management of resources and billing.

This invention provides a means of efficiently recording and billing business mileage to the customer or client. It would eliminate the need for pens, pencils and cumbersome mileage logs in the vehicle. This invention will allow the business person to automatically bill their mileage to a particular client's account and to record personal mileage. Mileage information can stored into the memory of the invention and be delivered to the user in cumulative totals of mileage for days, weeks, months or even years at a time. The information provided by the invention can be used to meet documentation requirements for internal audits and regulatory agencies of the government as well as increase the overall efficiency of motor vehicle usage by the business person.

SUMMARY OF THE INVENTION

This invention has a means for receiving information from the user through a keypad. The information can be numerical or alphabetical, depending on the needs of the user. The invention would process the information received by creating an account and maintaining that account until it was deleted by the user. Once an account has been created, the invention shall have a means for identifying the account and adding information to the account as required by the user.

The invention contains a central processing unit whose function is to access information from the odometer on a given vehicle, translate that information into mileage and record the mileage to the account indicated by the user. The central processing unit of the invention contains the processing means and memory required to read the odometer output, read the input pad and magnetic disk, and write to the input pad display and magnetic disk. At any given time, the user is able to remove the magnetic disk from the vehicle and transfer the mileage information to its business or personal computer.

The power required for this invention may be derived from the electrical power generated by the automotive system or from an external power source (e.g. batteries).

Variations of the invention would include a model for permanent installation into the dashboard of an motor vehicle, a plug:in model to be inserted into vehicle and removed at will, or a model that outputs information via a radio signal.

BRIEF DESCRIPTION OF THE DRAWINGS

The drawing depicts the general spacial arrangement of the housing and the key internal components of the invention. The "x" axis represents width, the "y" axis represents height, and the "z" axis represents depth. Data paths between components are designated by closed line segments.

The customer list data provided by the user flows from the magnetic disk through the Central Processing Unit (CPU) to the Liquid Crystal Display (LCD). The selections made by the user flow from the LCD through the CPU to the magnetic disk. Data from the transmission of the vehicle flows through the odometer to the CPU to the magnetic disk. Vehicle identification data flows from the dip switch to the CPU, then to the magnetic disk. An electrical power supply provides power for the whole invention.

DETAILED DESCRIPTION OF THE PREFERRED EMBODIMENT

Figure 1:
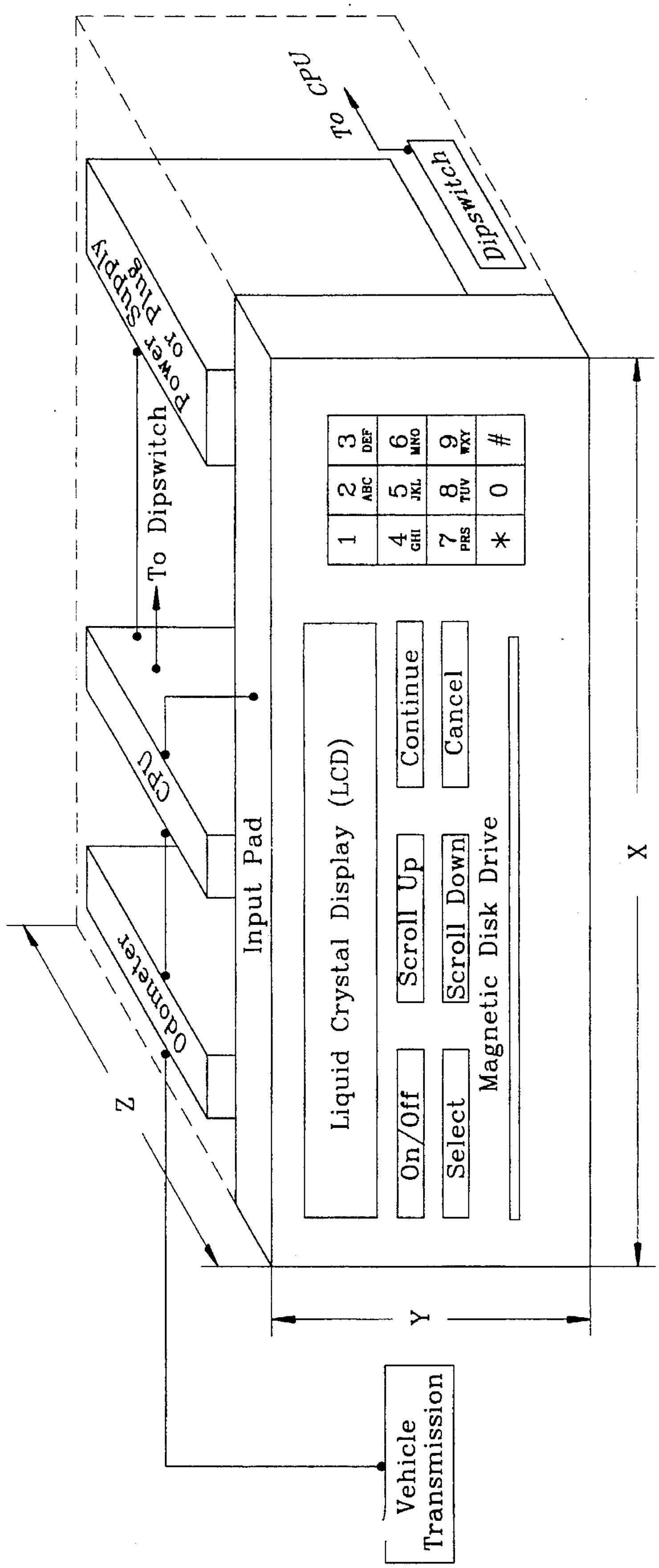

Although the size of the casing embodying the invention may vary, the preferred embodiment of the invention will be approximately 2" high and 6" wide and 7" deep. The casing will preferably be made of plated sheet steel in which all the internal components are housed. This case can be mounted in any motor vehicle either under the dash or in the dashboard using suitable brackets. Alternatively, the internal components of the invention may be housed within the compartment containing the motor vehicle radio, cassette, or cd player supplied by the motor vehicle manufacturer.

The invention is connected via a fused electrically conductive wire to the ungrounded side of the motor vehicle's electrical system. The grounded side of the electrical system is connected automatically once the case of the invention is mounted to any part of the motor vehicle's chassis.

A magnetic pulse generator is mounted between the odometer cable and the odometer. The pulse generator will yield at least one electrical pulse every time the odometer cable makes one revolution. This electrical pulse would be carried to the central processing unit of the invention via a two-wired shielded electrical cable.

A single insulated wire is connected to the ungrounded side of the motor vehicle's ignition circuit. Any time that the ignition is turned on the invention receives a high voltage (typically 12 volts) along this wire. Any time that the ignition is off, no voltage is found on this wire relative to the motor vehicle's ground. This arrangement functions as the on/off switch of the invention such that the invention is only engaged when the ignition of the motor vehicle is turned on.

The components of the invention include a custom or commercially available alphanumeric keypad for input of information from the user. This information includes account numbers, client names, the date/time and vehicle information. The keypad can also be used for direct input by the user of expenses for tolls and parking. For example, the user could enter "* T" and the toll amount to record toll expenses, or "* P" and the parking amount to record parking fees. The keypad is arranged at the front face of the invention just below or alongside a small liquid crystal or light emitting diode (LED) display. The display will show information generated by a microprocessor, and also all information input by the user of the vehicle. Below the display or alongside the keypad are a set of function keys which allow the user to turn the invention on of off and manipulate data from the display. A magnetic disk drive, similar to those commercially available in 3.5" or 5.25" format and used with personal computers, is mounted in the case so that magnetic disks can be inserted from the front of the invention.

Inside the casing of the invention and connected electrically to the magnetic disk drive, the alphanumeric keypad, and the display is the central processing unit, whose chief component is a microprocessor. The central processing unit is also electrically connected to the motor vehicle's ignition circuit, odometer cable, and electrical power supply by the wires and cables described above. The microprocessor is programmed to initially prompt the operator via a message displayed on the liquid crystal display to input the current date and time along with the first client's name (or client code) and the type of motor vehicle (including make, model, year, transmission type, and rear axle ratio). The microprocessor will correlate the pulses from the magnetic pulse generator to the motor vehicle specifications contained in its stored memory to determine the distance to be associated with each pulse from the magnetic pulse generator. The microprocessor has its own internal clock which is initially set by the user.

In the event of an electrical failure of the motor vehicle or of the invention itself, the microprocessor will reset and prompt the user to input a new time/date input. Otherwise, the user only needs to enter the time/date once—at the invention's initial start-up.

The microprocessor prompts the user to input a new client name into the keypad via a message on the liquid crystal display each time the ignition is turned off and then later turned on again. The microprocessor is programmed to accept a change of client name, at the user's election. Alternatively, the user may have a list of clients scrolled across the display and select from the list contained in the memory of the invention. The microprocessor may also be programmed so that if a code is not entered into the invention after ignition of the motor vehicle, a mechanism is engaged to prevent movement of the motor vehicle.

The microprocessor is programmed to record the motor vehicle's initial position, the distance travelled since the last record (via the magnetic pulse generator and motor vehicle data stored in its memory), whether the ignition is on or not, and the current client's name. This sampling takes place every second after which the microprocessor causes the magnetic disk drive to record the information on a magnetic disk.

The microprocessor also receives information from dipswitches that are set by the user in accordance with a predetermined setting that represents the model number and transmission type of particular motor vehicles. This information enables the microprocessor to accurately determine mileage by providing the number of odometer cable revolutions per mile for each type of motor vehicle.

Computer software supplied with the invention may be loaded into a personal computer. When run, the software asks the computer operator to insert a magnetic disk that contains data written to it by the invention. The software calculates speeds, the sum of distances traveled, and travel costs based on mileage and a per mile rate provided by the user. Printed reports can be made from the software listing clients, miles, charges, dates, for the day, week, month or other requested time period. The data format is organized into simple tables to allow direct transfer into the business database.

It should be noted that the examples provided herein are merely exemplary of the invention and are not intended to be limiting.

I claim:

1. A system for electronically recording and accounting for mileage of a motor vehicle comprising:

a first input means for receiving input data from a user of the system;

a display means connected to said first input means for displaying output data to the user;

a processing means directly connected to said first input means and said display means for manipulating said input data received from the user and mileage data received from an odometer connected to the motor vehicle;

a generation means for generating an electrical pulse to said processing means for each revolution of a cable, wherein said cable is connected to said odometer;

a second input means connected directly to said processing means for receiving model number data and transmission data for the motor vehicle wherein said second input means comprises a series of dipswitches, said dipswitches having at least two positions;

an output means connected to said processing means for storing said output data;

a power means for providing electrical power to the system.

2. The system of claim 1, wherein said first input means is comprised of an alphanumeric keypad and function keys.

3. The system of claim 1, wherein said first input means is further comprised of a magnetic disk drive and said magnetic disk drive is compatible with 3.5" or 5.25" magnetic disks.

4. The system of claim 1, wherein said output means consists of a magnetic disk compatible with 3.5" or 5.25" magnetic disks.

5. The system of claim 1, wherein said display means is comprised of a liquid crystal or light emitting diode display and a display driving circuit.

6. The system of claim 1, wherein said processing means is comprised of an electrically programmable memory, said processing means having the capability to read from and write to said memory.

7. The system of claim 1, wherein said generation means is comprised of a magnetic pulse generator located between said cable and said odometer, whereby said pulse generator generates at least one electrical pulse for each revolution of said cable.

8. The system of claim 1, wherein said power means is connected to the motor vehicle and receives electrical power from the motor vehicle.

9. The system of claim 1, wherein said power means is not connected to the motor vehicle and receives electrical power from a battery source.

10. A system for electronically recording and accounting for mileage of a motor vehicle comprising:

a first input means for receiving input data;

said input data including tolls, parking expenses, and a client account code;

a display means connected to said first input means for displaying data;

a processing means directly connected to said first input means and said display means for correlating said input data and mileage data received from an odometer connected to the motor vehicle to said client code;

a generation means for generating an electrical pulse to said processing means for each revolution of a cable, wherein said cable is connected to said odometer;

a second input means connected directly to said processing means for receiving model number data and transmission data for the motor vehicle;

a third input means consisting of a magnetic disk drive connected to said processing means for input of stored client account codes;

an output means connected to said processing means for long term storage of said output data, said output means being said magnetic disk drive;

a power means for providing electrical power to the system.

11. The device of claim 10 wherein said processing means is further connected to a lock-out thereby preventing movement of the motor vehicle if said client code is not entered.

12. The device of claim 10 wherein said electrical pulse from said generation means is transmitted to said processing means by a radio signal.

* * * * *